(No Model.)
J. B. JOHNSON.
TRANSPLANTER.
No. 371,072. Patented Oct. 4, 1887.
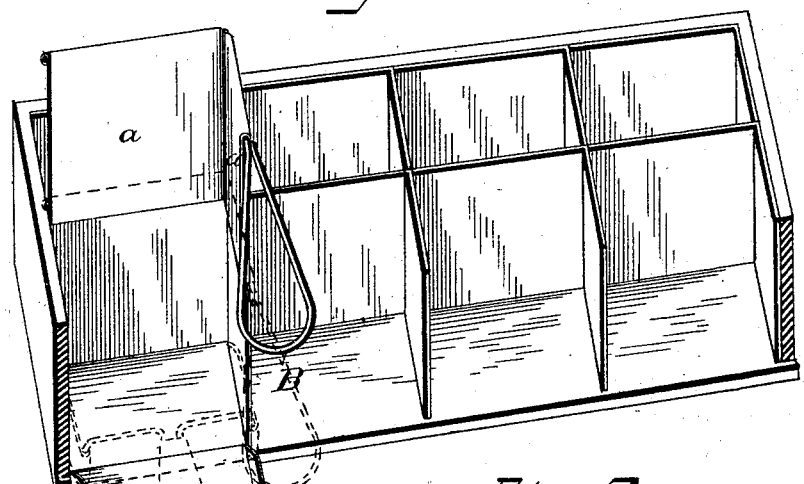
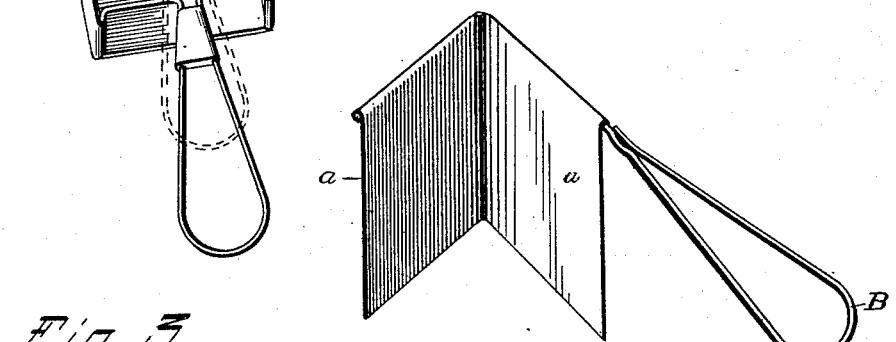
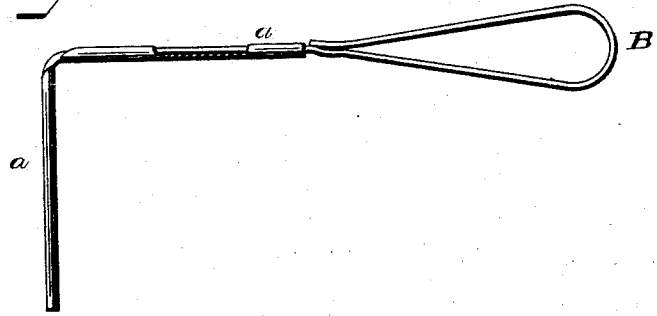
Witnesses.
Van Buren Hillyard,
L. Specht
Inventor.
John B. Johnson
By R. S. & A. P. Lacey
Att'ys.

UNITED STATES PATENT OFFICE.

JOHN B. JOHNSON, OF NEWTON, ILLINOIS.

TRANSPLANTER.

SPECIFICATION forming part of Letters Patent No. 371,072, dated October 4, 1887.

Application filed June 29, 1887. Serial No. 242,887. (No model.)

*To all whom it may concern:*

Be it known that I, JOHN B. JOHNSON, a citizen of the United States, residing at Newton, in the county of Jasper and State of Illinois, have invented certain new and useful Improvements in Transplanters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to transplanters, and has for its object the production of a device for separating the earth from the partitions, and which, in connection with a suitable lifter, may be conveniently manipulated for transferring the plant from the tray to the place in the ground prepared for it, and which can be readily removed from the ground at the completion of such transplanting without working injury to the tree or plant.

The invention is designed most especially as an improvement on the transplanter filed by me on the 7th day of December, 1886, Serial No. 220,874. However, I do not wish to be restricted in its use and adaptation, as it may be used equally well with other transplanters and propagating-trays.

The improvement consists in the peculiar construction and combination of parts, more fully hereinafter set forth and claimed, and shown in the annexed drawings, in which—

Figure 1 is a perspective view of a propagating-tray of my construction, having one side removed, embodying and showing the application of my invention; Fig. 2, a perspective view of the transplanter on an enlarged scale; and Fig. 3, a top plan view, parts being broken away, of the device.

The transplanter, or, properly speaking, the separator, is composed of a plate of sheet material (steel being preferred) bent midway its ends to form the wings $a$ $a$, which extend at right angles to each other, and the handle B, secured to the plate and projected laterally from one of the wings. The plate is preferably composed of sheet material, because it will offer little or no resistance to its insertion in the earth, especially if its lower edge is sharpened to a knife-edge. The upper edge is strengthened by having a stout wire spun therein, which wire is extended at one end and is bent to form the handle.

In practice, when it is desired to transplant the plants—such as are grown in compartments in trays—one side of the tray is removed, and the transplanter is placed with its lower edge on the top of the earth and contiguous to the walls of the compartment and is forced down, thus separating the earth from said walls. A suitable lifter is now inserted between the bottom of the tray and such separated or detached block of earth, and by means of said lifter and separator the plant is transferred from the tray to the place prepared for its reception in the ground.

The transplanter may be used independently of the lifter by inserting one of the wings between the detached block of earth and the bottom of the tray after it has first been used as a separator in the manner hereinbefore described.

Having thus described my invention, what I claim, and desire to secure by Letters Patent, is—

1. The combination, with the propagating-tray having a series of compartments, of the transplanter composed of two wings arranged at an angle to each other, and provided with a handle, and the lifter to act in opposition to the transplanter, substantially as and for the purpose set forth.

2. The herein shown and described transplanter, composed of a plate of sheet material bent midway of its ends to form two wings at an angle to each other, and the wire bent to the angle of the plate and spun in its upper edge, one end of the wire being extended to form a handle, substantially as and for the purpose described.

In testimony whereof I affix my signature in presence of two witnesses.

JOHN B. JOHNSON.

Witnesses:
 GEORGE H. SHUP,
 WILLIAM SHUP.